Patented Nov. 6, 1951

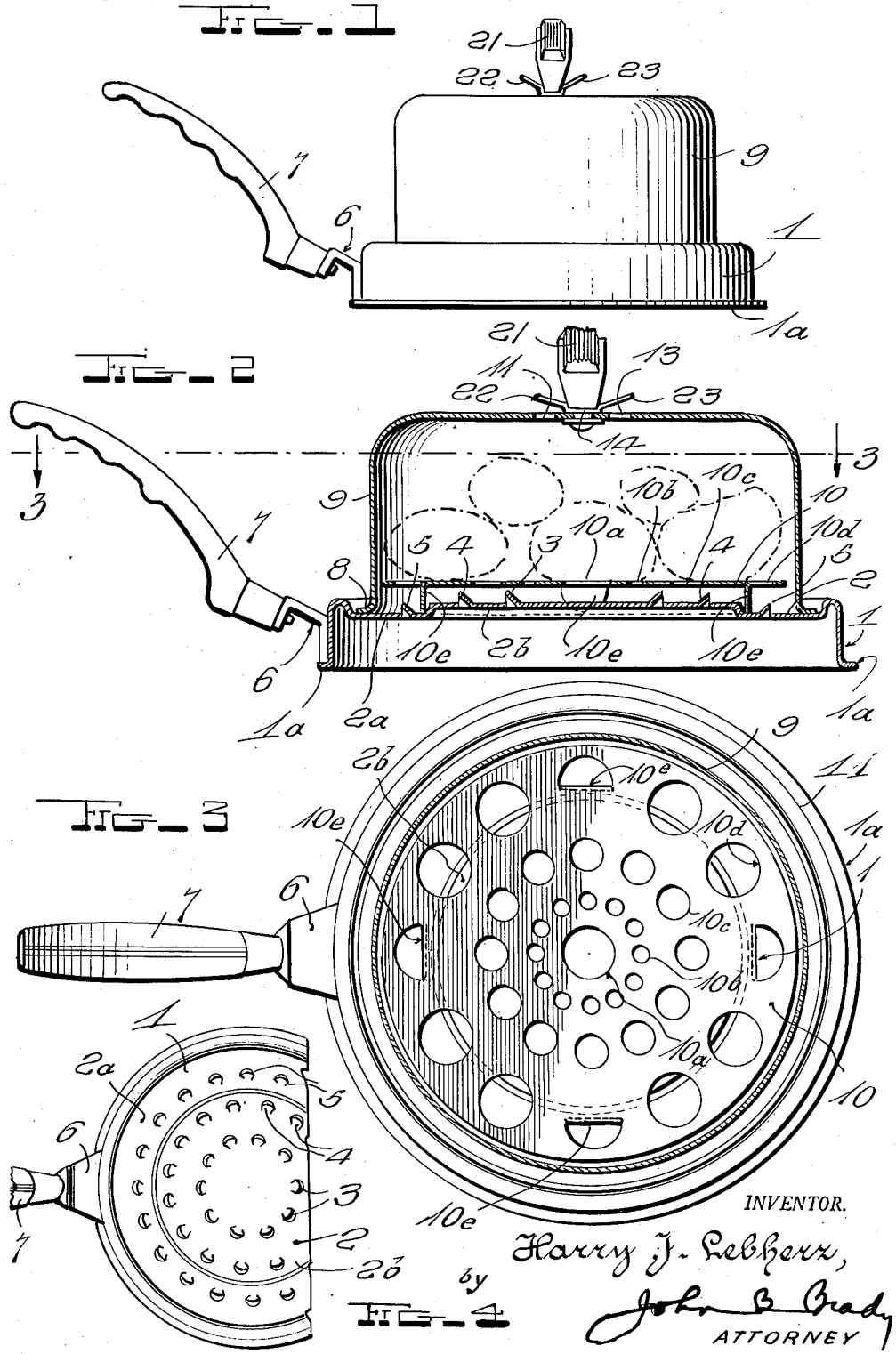

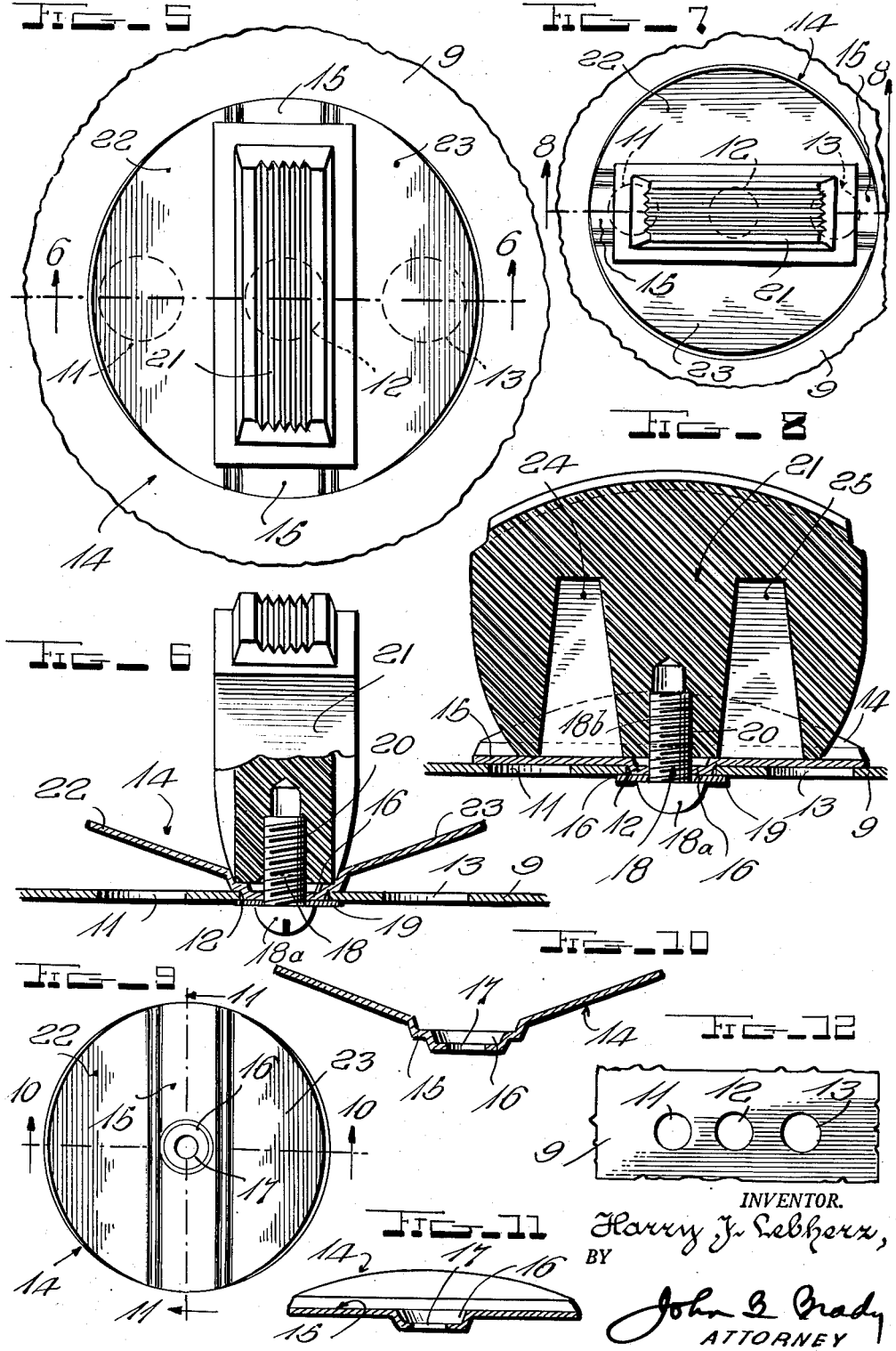

2,573,719

UNITED STATES PATENT OFFICE 2,573,719

REGULATING VALVE FOR COOKING UTENSIL COVERS

Harry J. Lebherz, Frederick, Md., assignor to The Eveready Company, Frederick, Md., a corporation of Maryland.

Application May 26, 1948, Serial No. 29,289

4 Claims. (Cl. 220—44)

My invention relates broadly to kitchen appliances and more particularly to a baking appliance for use on cook stoves.

One of the objects of my invention is to provide an improved baker for operation over the top burners of cook stoves.

Another object of my invention is to provide an efficient construction of baking utensil for use over the top burners of cook stoves, having means for supporting vegetables to be baked and including an improved valve mechanism for regulating the baking time period.

Still another object of my invention is to provide an improved valve mechanism for controlling the effective size of the ventilating openings in the cover of the baking appliance for correspondingly regulating the rate of baking time.

Still another object of my invention is to provide a construction of baking appliance for use over the burners of gas or electric stoves, including a manually adjustable valve mechanism having a central closing portion and a pair of heat convection current operating portions operative in coaction with ventilation openings in the cover of the appliance for efficiently regulating baking time.

Other and further objects of my invention reside in the improved construction of baking appliance for cook stoves as set forth more fully in the specification hereinafter following by reference to the accompanying drawing, in which:

Figure 1 is a side elevational view of the baking appliance of my invention showing the valve mechanism at the top of the cover; Fig. 2 is a vertical sectional view through the baking appliance illustrating the valve mechanism moved to open position for venting the interior of the baking appliance; Fig. 3 is a transverse sectional view taken substantially on line 3—3 of Fig. 2; Fig. 4 is a plan view partially broken away, showing the portion of the baking appliance which is placed immediately over the burner or hot plate of a cook stove; Fig. 5 is a top plan view of the valve mechanism used in the baking appliance of my invention, the valve mechanism being shown in position for venting the baking appliance; Fig. 6 is a vertical sectional view taken substantially on line 6—6 of Fig. 5; Fig. 7 is a plan view showing the valve mechanism in a position closing the vent openings in the cover of the baking appliance; Fig. 8 is a vertical sectional view taken substantially on line 8—8 of Fig. 7; Fig. 9 is a plan view of the valve plate embodied in the valve mechanism of my invention and showing more clearly the deflecting portions of the valve plate on each side of the vent closing portions of the valve plate; Fig. 10 is a transverse sectional view taken substantially on line 10—10 of Fig. 9; Fig. 11 is a longitudinal sectional view through the valve plate taken substantially on line 11—11 of Fig. 9; and Fig. 12 is a fragmentary view of the top of the cover of the baking appliance and showing the arrangement of the vent openings on diametrically opposite sides of the central pivot aperture through which the valve mechanism is journaled.

My invention is directed to a baking appliance for use over the burners or hot plates of gas or electric stoves for economically and rapidly baking potatoes or warming buns, or foods. The baking appliance is pressed from metallic sheet material and comprises a base support which may be readily centered over the top of a burner or hot plate, the base support being provided with up-struck hooded baffles for the passage of heat convection currents. A trivet is arranged over the base support and is provided with heat circulating passages so that heat convection currents may readily circulate therethrough for heating potatoes, vegetables, buns or food, supported by the trivet. An enclosing cover is mounted upon the base support and extends around the trivet and over the potatoes, vegetables, or other foods, mounted on the trivet, so that a cover is provided with ventilating openings in the top thereof. These ventilating openings are controlled by a very special construction of regulating valve which I have found very effective in properly controlling the baking process.

Referring to the drawings in detail, reference character 1 designates the base support having a central supporting plate 2 with a flat annular solid portion 2a serving as a support for the annular peripheral edge 8 of the cover member 9. The central supporting plate 2 is provided with a central upwardly displaced section 2b and in this section I provide annular rows of radially disposed up-struck hooded baffles represented at 3 and 4. In the flat annular peripheral zone 2a I provide an annular row of radially disposed up-struck hooded baffles 5. The rows of radially disposed up-struck hooded baffles 3, 4 and 5, are pierced through the central supporting plate and provide passages for heat convection currents from the burner or hot plate from which the supporting plate is spaced by means of the circular peripheral flange 1a of the base support 1. A bracket member 6 is secured to one side of the base support 1 and serves as a connecting means for a handle member 7.

The cover member 9 fits over the central supporting plate 2 and is supported thereon by an annular peripheral edge 8 contacting a flat annular peripheral zone 2a in central supporting plate 2. The cover member encloses the trivet 10 which is formed by a flate plate having a central aperture 10a therein and a plurality of concentric circular rows of apertures represented at 10b, 10c, and 10d of increasing size. The outside row 10d has diametrically opposite apertures therein partially perforated in approximately semi-circular apertures with a downwardly depending lug extending therefrom forming feet 10e for the trivet which fit immediately around the central upwardly displaced section 2b of the central supporting plate 2 enabling the trivet to be maintained in position. The trivet 10 provides a support for the potatoes, vegetables, buns or other foods which are to be baked, warmed or cooked within the utensil.

The cover 9 has the hooded top thereof provided with a row of equally spaced diametrically aligned perforations shown at 11, 12 and 13 in diametrical alignment. These perforations are symmetrically arranged at the center of the cover member 9. Perforations 11 and 13 comprise vent openings, whereas, central perforation 12 forms a journaling means for rotatably supporting the valve 14. Valve 14 is shaped in a very special manner and is generally circular in contour including a flat diametrically extending portion 15 having a central outstruck downwardly extending circular projection 16 therein. Projection 16 is circular in contour and is centrally apertured at 17. The central diameter of the displaced portion 16 of the valve 14 substantially conforms with the internal diameter of the central perforation 12. That is to say, the displaced portion of the valve 14 constituted by the circular projection 16 enters the perforation 12 and is rotatable therein. The thickness of the metallic sheet material forming the valve 14 corresponds to the thickness of the material constituting the cover 9. Thus, when the valve 14 is centered in the aperture 12 the valve is free to revolve in aperture 12 with the projection 16 thereon rotating within aperture 12 as a bearing. In order to retain valve 14 in position with respect to cover member 9 I provide a securing screw 18 having a securing head 18a thereon and a screw-threaded shank 18b thereon which passes through washer member 19 and engages within the internally screw-threaded recess 20 in knob 21. The knob 21 is formed from plastic material having a length substantially conforming with the length of the flat diametrically extending portion 15 of the valve and filling the space between the angularly extending deflecting portions of the valve shown at 22 and 23. The deflecting portions 22 and 23 of the valve extend upwardly at an angle of approximately 30° with respect to the plane of the top of the cover member 9. The diameter of the valve 14 and the distance from tip to tip of the deflecting portions of the valve and the diametrical dimension of the flat diametrical portion 15 of the valve extend beyond the limits of the perforations 11 and 13. Thus the flat knob 21 to which the valve 14 is secured by screw 18 for rotative movement in perforation 12 as a journal may be revolved from the position illustrated in Figs. 5 and 6 in which vent openings 11 and 13 are fully open to the position illustrated in Fig. 8 in which the flat diametrically extending portion 15 of the valve entirely closes the vent openings 11 and 13 as illustrated in Figs. 7 and 8. In moving from the position illustrated in Figs. 5 and 6 to the position illustrated in Figs. 7 and 8 the valve is confined with respect to the top of cover member 9 by means of washer 19 bearing against the under surface of cover member 9 and the flat diametrically extending portion 15 of the valve bearing against the upper surface of the cover member 9. Thus the valve moves in a journal which has a thickness substantially the same as the thickness of the material of the revolvable valve.

The knob 21 is molded as lightly as possible utilizing a minimum amount of plastic material with cored openings 24 and 25 as shown in Fig. 8.

In the operation of the baking appliance, when used for example in baking potatoes, the following procedure is utilized:

1. Wash four or five medium sized potatoes. Pierce each potato to center in several places with fork. This permits steam to escape and hastens cooking process. (If desired skins may be greased.) While damp, place potatoes on trivet under the cover of the baking appliance. 2. Place entire unit on burner or element on top of stove. Turn heat to Medium-Low. 3. Turn knob to close vent holes for first ¼ hour. Then open for balance of process. In cooking with gas, leave vent holes open for entire operation. 4. Baking time—¾ to 1 hour. The baking appliance is designed for use on top of the stove which will require very little gas or electricity. The result is a great saving in fuel costs over the method of using the large oven of the ordinary stove, which incurs a fuel cost, at times exceeding that of the potatoes.

The two limits of movement of the valve are displaced approximately 90° from each other. In order to close the vent openings 11 and 13 the flat diametrically extending portion 15 of the valve completely covers vents 11 and 13. In order to vent the baking appliance, the valve is shifted 90°, whereupon, the deflecting portions 22 and 23 as illustrated in Fig. 6 deflect convection currents of heat from the interior of the cover member 9 away from knob 21.

I have found the baking appliance of my invention highly practical in manufacture and use, and while I have described one of the preferred embodiments of my invention I realize that modifications may be made and I desire that it be understood that no limitations upon my invention are intended other than may be imposed by the scope of the appended claims.

What I claim as new and desire to secure by Letters Patent of the United States is as follows:

1. A regulating valve for a cover member having a plurality of ventilating openings in the top thereof comprising a knob journaled for rotary movement intermediate the ventilating openings and a circular valve plate having a pair of upwardly protruding portions bent on chords of said plate connected with said knob and interposed between the cover member and the knob and shaped to cover the ventilating openings in the cover member in one position of said knob and movable to a position uncovering the ventilating openings in another position of said knob with said upwardly protruding portions deflecting convection currents which pass through the ventilating openings.

2. A regulating vent for a cover member having a series of substantially aligned openings in the top thereof comprising a valve plate having a centrally extruded portion projecting into one of the openings in the cover member, an actuating knob, a fastening device for securing the actuating knob in position immediately adjacent said valve plate and confining the extruded portion of said valve plate on the cover member, a diametrically extending flat surface portion coextensive with said valve plate extending in surface contact with the cover member for closing the ventilating openings in one position of said valve plate, and a pair of upwardly and outwardly extending deflector plate portions integral with said diametrically extending portion of said valve plate and movable to a position over the ventilating openings when said knob is moved to a position in which the diametrically extending portion of said valve plate uncovers the ventilating openings.

3. A regulating vent for a cover member having a series of substantially aligned openings in the top thereof comprising a valve plate having a centrally extruded portion projecting into one of the openings in the cover member, an actuating knob, a fastening device for securing the actuating knob in position immediately adjacent said valve plate and confining the extruded portion of said valve plate on the cover member, a diametrically extending flat surface portion coextensive with said valve plate and extending in surface contact with the cover member for closing the ventilating openings in one position of said valve plate, and a pair of deflector plate portions integral with said diametrically extending portion and projecting upwardly at approximately 30° to the plane of said diametrically extending portion and movable to a position over the ventilating openings when said knob is moved to a position in which the diametrically extending portion of said valve plate uncovers the ventilating openings for directing convection currents issuing through the ventilating openings in opposite directions away from said knob.

4. A regulating vent for a cover member having a plurality of symmetrically disposed openings therein in substantially linear arrangement comprising a valve plate having a flat diametrically extending portion, a centrally disposed extruded portion projecting from said flat diametrically extending portion to a distance appreciably less than the thickness of the material of the cover member with which it coacts and journaled through one of the openings therein, a knob extending over the flat diametrically extending portion of said valve plate, means engaging the under surface of the cover member and connected with said knob for confining said valve plate and knob in position whereby said valve plate may be angularly shifted from a position closing the other of said openings to a position uncovering said openings, and a pair of angularly disposed deflecting portions integrally connected with said valve plate for directing convection currents from the openings in said cover member away from said knob while the said openings are uncovered by said valve plate.

HARRY J. LEBHERZ.

REFERENCES CITED

The following references are of record in the file of this patent:

UNITED STATES PATENTS

| Number | Name | Date |
| --- | --- | --- |
| 427,519 | Milner | May 6, 1890 |
| 675,911 | Tipney | June 11, 1901 |
| 785,880 | Hill | Mar. 28, 1905 |
| 1,149,289 | Post et al. | Aug. 10, 1915 |
| 1,471,961 | Hovoy | Oct. 23, 1923 |
| 1,711,631 | Burnett | May 7, 1929 |
| 1,725,521 | Keiner | Aug. 20, 1929 |
| 2,170,904 | Kircher | Aug. 29, 1939 |